Patented Aug. 11, 1936

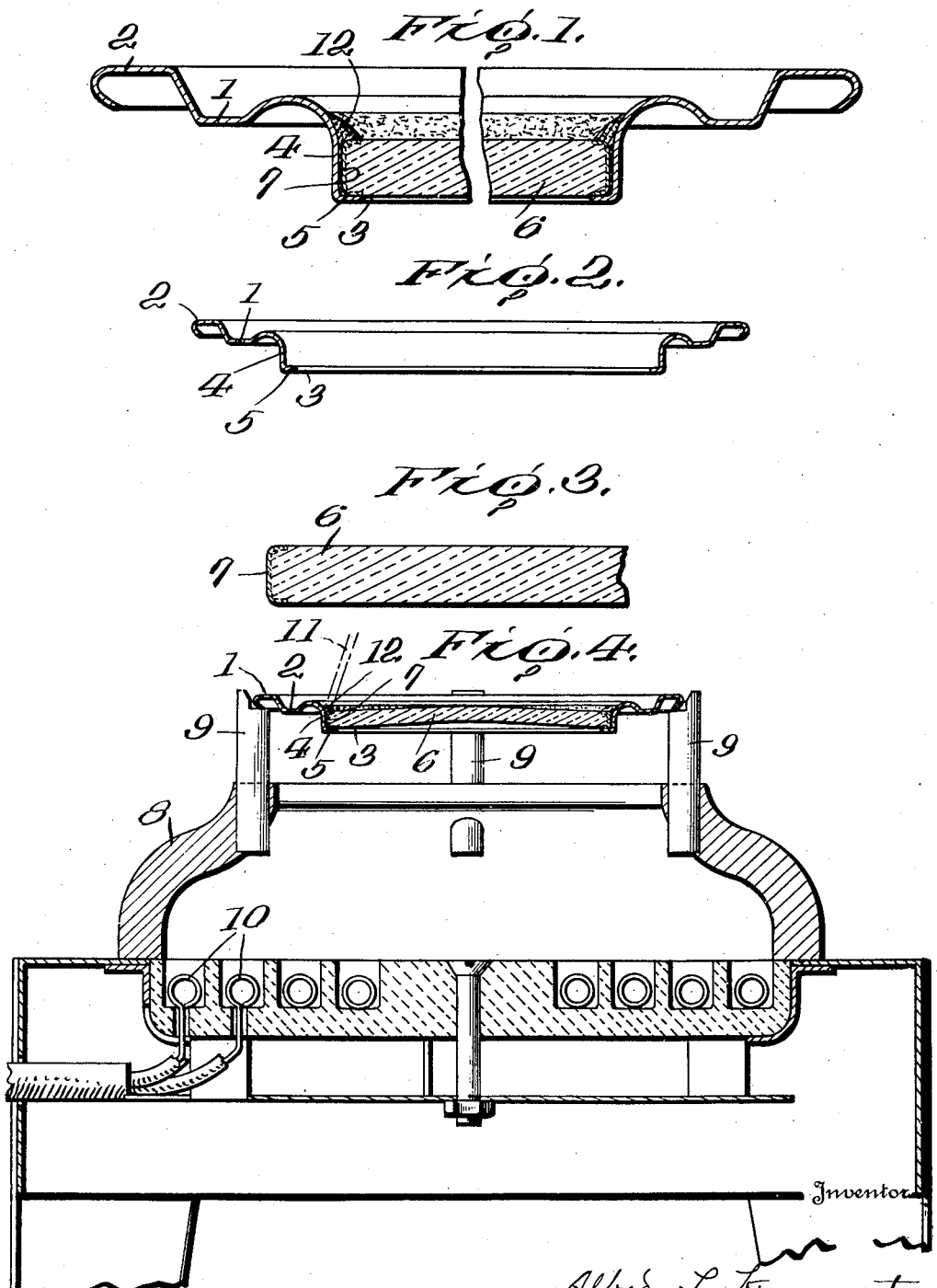

2,050,576

UNITED STATES PATENT OFFICE 2,050,576

METHOD OF FORMING A CLOSURE END FOR CONTAINERS

Alfred L. Kronquest, Syracuse, N. Y., assignor to Continental Can Company, Inc., New York, N. Y., a corporation of New York Application July 10, 1933, Serial No. 679,815

1 Claim. (Cl. 49—81)

The invention relates to new and useful improvements in a method of forming closure ends for containers, and more particularly a closure end having a transparent glass panel through which the contents of the container may be viewed. In my co-pending application Serial No. 672,297, filed May 22, 1933, there is shown and described a closure end for containers wherein a glass panel is secured to the metal portion of the end by a direct metal to glass contact which is hermetic.

An object of the invention is to produce a closure end of the above type whereby the glass panel is connected to the closure end through a metal bond producing an hermetic seal.

A further object of the invention is to provide a method of bonding a glass panel to the closure end wherein the heat applied to the closure end during the completion of the bond is insufficient to discolor the surface of the metal forming the closure end or the lacquer coating thereon.

In the drawing which illustrates diagrammatically the steps of the method embodying the invention:

Figure 1 is a sectional view through a closure end with a glass panel bonded thereto by my improved method;

Fig. 2 is a transverse sectional view of the closure end prior to the attaching of the glass panel thereto;

Fig. 3 is a transverse sectional view through the glass panel with a metallic rim attached thereto preparatory to the securing of the same to the closure end, and Fig. 4 is a view showing diagrammatically a form of means for heating the closure end and panel, and the bonding of the metallic rim of the glass panel to the closure end.

In my prior application, there is shown, described and claimed a metal container having a closure end provided with a glass panel centrally thereof through which the contents of the container may be viewed. This glass panel is attached to the closure end through an hermetic joint which is of a character to stand heat sufficient to permit the processing of the food product within the container after the container has been closed and sealed. In the producing of this article, the glass panel has a metallic rim attached thereto in such a way as to provide an hermetic joining of the metal to the glass. This glass panel with the metallic rim attached thereto is joined to the closure end through the solder bonding of the metal rim to the closure end. The present invention has to do with a method of producing the article just described.

The invention will be best understood by a description in detail of one method of carrying out the same. While the closure end may be of any desired shape and construction, it is preferably formed as shown in Fig. 2 of the drawing, and consists of a metal portion 1 terminating at the peripheral edge thereof in a flange 2 which is adapted to be rolled with a flange on the body portion of the container into a double seam of the character shown in my co-pending application. Centrally of the end there is an opening 3. Surrounding the opening 3 is a vertical wall 4, at the lower edge of which is a ledge or seat 5 for the glass panel.

In Fig. 3 of the drawing, there is shown in detail a glass panel which consists of a roundel of glass indicated at 6. This glass is preferably glass capable of withstanding fracturing when heated. It is also clear and transparent so that the contents of the container may be viewed therethrough. The glass roundel is provided with a metallic rim 7 which extends all the way around the periphery and on to the side edge portions adjacent the periphery, and substantially constitutes an integral part of the panel, so that the metallic rim and the glass are fused in an hermetic seal. Such an intimate union may be accomplished by applying to the edge of the glass roundel, a mixture of two parts of bronze powder with one part of lead borate powder, and sufficient turpentine to form a smooth paste. The mixture is then fused in place at about 1000 degrees F. After cooling, the disk is cleaned with a sulphuric acid-potassium bichromate mixture, and then dipped into a molten bath containing ninety percent of tin and ten percent of zinc, the bath having a flux composed of ethylamine hydrochloride and glycerine (equal parts) spread over its surface. As a result, the metallic rim 7 is formed on the glass roundel so that it is fused thereto and substantially integral therewith, the joint between the metallic rim and the glass roundel being an hermetic joint which will stand the ordinary temperatures of processing and without rupturing. It will also stand internal pressure on the container without fracturing. The particular method of attaching the metallic rim to the glass roundel so as to produce an hermetic joint therebetween forms no part of the present invention, and other ways may be utilized for securing the metallic rim to the glass roundel so as to produce between the two a direct metal to glass hermetic joint.

The glass panel with the metallic rim attached is placed on the seat ledge 5 of the closure end. The closure end and the glass panel are then subject to a heating means and raised to a temperature above that of the melting point of soft solder. It is often desirable to coat the inner face of the closure end with a lacquer so as to protect the food product and prevent the same from contacting directly with the metal of the container end. Lacquers have been produced which will stand, without discoloration, temperatures above the melting point of soft solder. In the heating of the metal parts, the temperature while raised well above the melting point of soft solder is insufficient to discolor the metal forming the closure end or the protecting lacquer coating thereon.

In Fig. 4 of the drawing, there is shown diagrammatically one way of heating the closure end and panel after they are assembled preparatory to the solder bonding of the metallic rim of the glass panel to the closure end. There is shown in this figure of the drawing an electric furnace consisting of a body portion 8 terminating in a seating rim 9. Located in the base of the furnace are electric heating units 10. The assembled can end closure and glass panel are placed on this seating rim of the furnace. The heat radiated from the electric units contacting with the under face of the glass panel and the closure end will raise the same to the desired temperature for solder bonding the metallic rim to the closure end. The temperature of the furnace is preferably limited to 400 degrees F., so that no matter how long the assembled units may be left on the seat closing the opening at the top of the furnace, the temperature imparted thereto will not exceed 400 degrees F. At this temperature, the surface of the metal or the lacquer coating applied thereto, will not be discolored and at the same time, the metal parts are heated to a temperature above the melting point of soft solder.

In Fig. 4 of the drawing, there is shown a stick 11 of soft solder which may be manually or automatically brought into contact with the vertical wall 4 of the closure end, and as the solder is melted through this contact with the heated wall, it will flow down into the space between the metal rim and the vertical wall, filling the same as indicated at 12 in Fig. 1 of the drawing. The solder stick is moved around the vertical wall so as to gradually build up and fill the recess and produce a smooth surface extending from the inner edge of the metallic rim on the glass panel to a point adjacent the upper edge of the vertical wall 4.

It will be noted that the metal is attached to the glass panel before the parts are assembled, and therefore, heat may be applied far in excess of that required to melt the solder during the solder bonding operation. Inasmuch as the rim is attached to the panel before the parts are assembled, this intense heat necessary to bring about the fusing of the metal to the glass is not applied to the closure. Such an intense heat would discolor the metal of the closure end and discolor or ruin the lacquer coating thereon. The temperature incident to the solder bonding of the metallic rim to the closure end is insufficient to cause any discoloration of the metal or the lacquer, and at the same time, it completes the bonding of the glass panel to the closure end by a joint which is hermetic and which will stand the temperature of processing without breaking down. It will be noted that in the producing of a metallic bond between the glass roundel and the metal closure end, no pressure is applied, the bonding of the parts is accomplished solely through the contacting of the glass and metal parts and the application of heat thereto. In all previous structures where glass panels are attached to metal parts, a folding of the metal about the glass is necessary, which is likely to fracture the glass and a plastic sealing bond of some character is used which will not stand processing. The sealing material which is applied to the container end at the flange thereof for double seaming purposes, is applied after the glass panel has been attached to the closure end so that said sealing material is not subjected to the heat incident to the producing of the bond between the glass and the closure end.

It is obvious that the method constituting my invention may be carried out in other ways than by the specific steps and by the use of the specific temperature above stated. It is essential, however, that the glass roundel forming the transparent panel of the container shall be secured to the metal of the closure end by an hermetic joint consisting solely of metal to metal contact and metal to glass contact, so that the completed end closure when attached to a container, may be subjected to the temperature incident to the processing of the food product sealed within the container without in any way disturbing the connection between the panel and the container end.

Having thus described the invention, what I claim as new and desire to secure by Letters Patent is:

The method of manufacturing a can end closure having a glass panel therein consisting in forming the end closure with a depression providing a wall extending at right angles to the plane of the end closure, said wall having an inturned portion at the lower edge thereof forming a seat for a glass panel, positioning on said seat a glass panel having a metallic rim fused thereto and formed integral with the glass panel, heating the metal of the closure end in the region of the seat, the glass panel throughout its entire extent, and the metal rim to a temperature above the melting point of soft solder and insufficient to discolor the surface of the metal and applying soft solder while the parts are heated for filling the space between the metal on the glass panel and the wall on the closure end for bonding said glass panel to said closure end.

ALFRED L. KRONQUEST.